United States Patent [19]

Rocco et al.

[11] 4,360,096

[45] Nov. 23, 1982

[54] AUTOMATIC CENTERING SYSTEM AND METHOD FOR USING SAME WITH POST-INFLATOR APPARATUS

[75] Inventors: Harold S. Rocco, 4271 Darrow Rd., Stow, Ohio 44224; Joseph C. Smith, Greentown, Ohio

[73] Assignee: Harold S. Rocco, Stow, Ohio

[21] Appl. No.: 178,855

[22] Filed: Aug. 18, 1980

[51] Int. Cl.³ ............................................... B65G 49/00
[52] U.S. Cl. ................................... 198/345; 425/28 P
[58] Field of Search .............. 425/28 P; 198/345, 633, 198/634, 746, 736, 721, 785

[56] References Cited

U.S. PATENT DOCUMENTS

| | | | |
|---|---|---|---|
| 2,434,632 | 1/1948 | Young | 198/746 |
| 3,001,334 | 9/1961 | Giusti et al. | 425/28 P |
| 4,277,217 | 7/1981 | Miller et al. | 198/746 X |

*Primary Examiner*—John J. Love
*Assistant Examiner*—Douglas D. Watts
*Attorney, Agent, or Firm*—Oldham, Oldham, Hudak & Weber Co.

[57] ABSTRACT

An automatic centering system is disclosed for use in connection with any two work stations in an automated assembly line, where the workpiece must be transferred, centered, and manipulated at the second work station. The workpiece is transferred along rollers to a staging area where it is restrained and then moved by items of machinery on the outer circumference and the inner circumference, respectively, of the workpiece. A tire released from the tire press may be restrained and then moved over a post-cure inflator apparatus and accurately centered for inflating. After inflating, the tire is directed from the automatic centering system to the next operation.

14 Claims, 10 Drawing Figures

AUTOMATIC CENTERING SYSTEM AND METHOD FOR USING SAME WITH POST-INFLATOR APPARATUS

TECHNICAL FIELD

This invention relates to the automated centering of any object upon a second work station after transfer from a first work station. The centering is accomplished through restraint and movement of the annular workpiece. A tire may be so centered for post-cure inflating.

BACKGROUND ART

Heretofore, most press and post-inflation systems presently in the art employ gravity conveyors, or a combination of gravity conveyors and belt-driven conveyors to transport the cured tire from the press to the post-inflator ring position after the tire is discharged from the curing press. The centering of the cured tire over the bottom ring of the post-inflator, after discharge from the press, presently employs manual adjustment of outboard centering rolls, a manual adjustable tire stop, or a manually adjustable photoelectric eye device. Other systems, transporting a workpiece from one point to another, have disclosed a variety of methods and apparatus developed for automatic control purposes. For example, U.S. Pat. No. 4,010,780 uses a roller system to restrain the movement of batteries to a service area where they are filled with fluid. U.S. Pat. Nos. 3,102,627; 3,302,768; and 3,960,260 perform specific conveyance and manipulation of workpieces known or associated with tire production. Finally, U.S. Pat. Nos. 3,155,242; 3,235,073; 3,785,195; 3,858,707; 4,049,500; 4,096,731; 4,148,400; and 4,149,620 describe other conveyance devices of interest in non-tire production facilities.

The present methods used in the art of tire production, and the manipulation of items found in related or other arts, fail to disclose the proper care and treatment necessary for centering an annular workpiece over a work station, particularly a cured tire over the post-inflator apparatus. In the latter circumstance, failure to properly center this cured tire results in a defective tire subject to a distorted post-inflation. Because the tolerances for centering a cured tire in the post-inflator apparatus are exacting, the need for an accurate method is readily seen. However, incorporating an accurate centering system with an automatic centering device is not taught by those skilled in the art and is greatly needed for the efficiency and accuracy of tire production in an automated technology.

DISCLOSURE OF INVENTION

Therefore, it is an object of the invention to provide an automatic centering apparatus adjacent to a work station, wherein the apparatus gathers and contacts the outer circumference of the annular workpiece, transports the workpiece to an exact position over the work station by contact with the inner circumference of the annular workpiece, and discharges the workpiece from that station.

Yet another object of the invention is a method for centering the annular workpiece on a work station, wherein the centering steps are accomplished by an automatic centering apparatus which repeatedly aligns the workpiece at the work station in an accurate position.

Still another object of the invention is to provide a centering apparatus which collects the workpiece on a conveyor, transports the workpiece to a work station, and returns to its point of beginning for accepting another workpiece for processing.

These and other objects of the invention, which will become more apparent as the detailed description of the preferred embodiment proceeds, are achieved by: an automatic workpiece centering device on a frame between two work stations, the workpiece being of annular shape and having an inner circumferential surface and an outer circumferential surface, comprising: (a) a plurality of conveyor rollers rotatably mounted on the frame at inward angles (b) a movable workpiece positioning apparatus mounted on the frame and having a curvilinear contact surface to contact the outer circumferential surface of the workpiece; (c) a slidable interior control apparatus slidably mounted on the frame and having a pivotable interior control finger pivotally extending therefrom capable of communication with the inner circumferential surface of the workpiece; (d) a plurality of stationary contact items mounted on the frame at the second work station, said workpiece positioning apparatus restraining the workpiece on said conveyor rollers, said pivotable interior control finger controlling the annular workpiece in a forward direction to the second work station, and said stationary contact items maintaining the workpiece at the work station in an accurately centered position.

The objects of the invention are further achieved by: a method for centering an annular workpiece on a work station, comprising: (a) sliding the annular workpiece along a plurality of inwardly angled conveyor rollers: (b) contacting the outer circumferential surface of the annular workpiece with a curvilinear contact surface of a workpiece positioning apparatus; (c) contacting the inner circumferential surface of the annular workpiece with a pivotable control finger of an interior control apparatus; (d) disengaging said outer circumferential surface of the annular workpiece from said curvilinear contact surface of said workpiece positioning apparatus; (e) sliding said interior control apparatus in a forward direction to push the annular workpiece to an accurately centered position on the work station; (f) disengaging said interior control finger from said inner circumferential surface of said annular workpiece; and (g) retracting said interior control apparatus to its home position.

BRIEF DESCRIPTION OF THE DRAWINGS

For an understanding of the scope of the invention, reference is had to the following drawings, wherein.

BEST MODE FOR CARRYING OUT THE INVENTION

The automatic centering apparatus of the present invention is applicable to the automated manipulation of any annular workpiece. Depending upon the degree of control to be exercised over the annular workpiece, either of two embodiments may be employed. The first embodiment is displayed in FIGS. 1-6, while the second embodiment is displayed in FIGS. 7-9 and applicable portions of FIGS. 1-6.

The best mode of this invention is contemplated for use with cured tires in the operations from the tire press through to post-cure inflation. However, it is perceived that any annular workpiece may be manipulated between two work stations, according to the concepts of this invention.

Figure 1A:
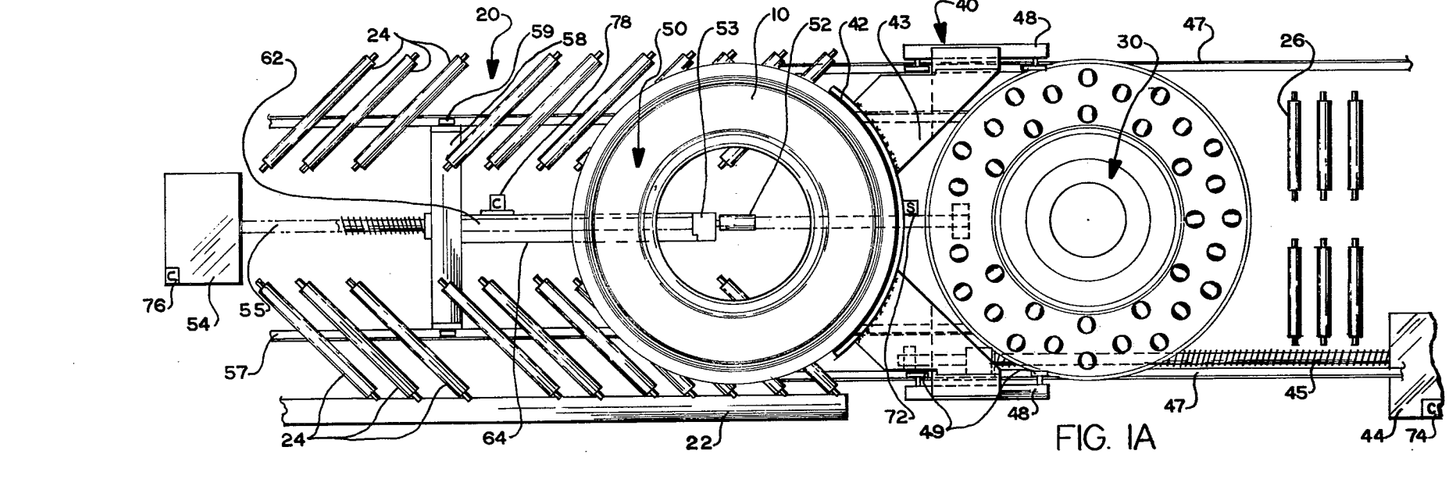
FIG. 1A is a top-plan view of one embodiment of the automatic centering apparatus in conjunction with the post-cure inflator apparatus.
Figure 1B:
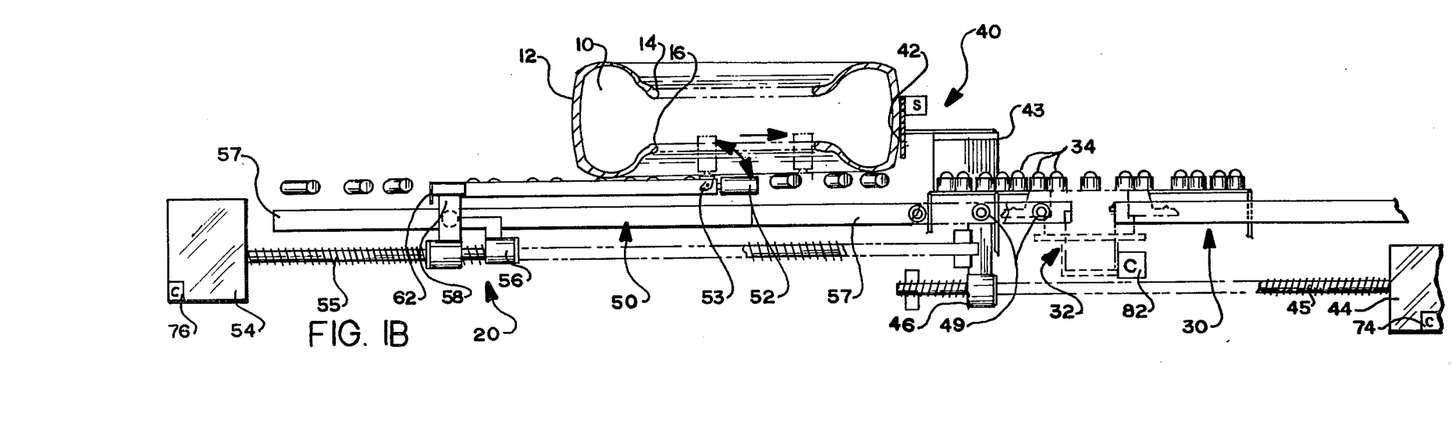
FIG. 1B is a side view, cut away at strategic places, of that first embodiment of the automatic centering apparatus and the post-cure inflator apparatus.
Figure 7:
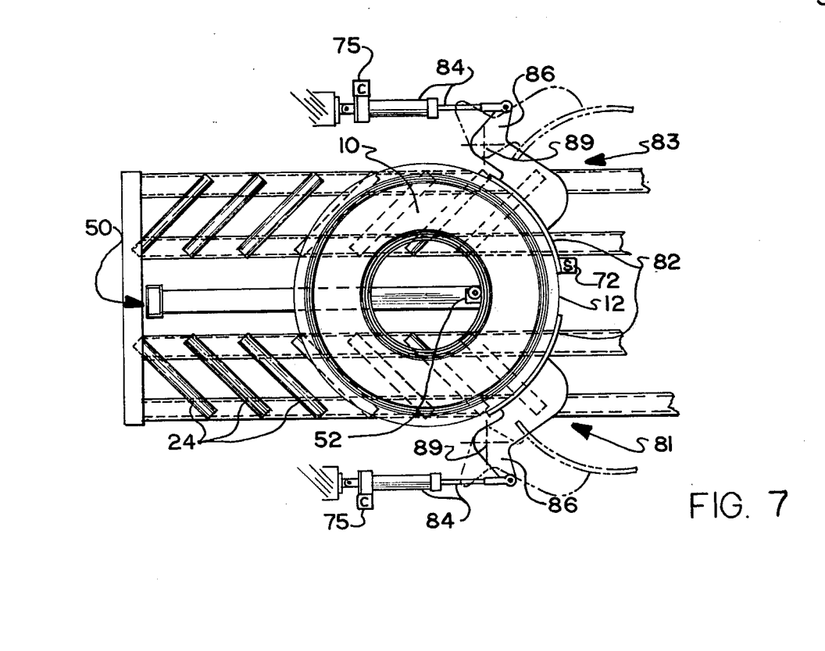
FIG. 7 is a top plan view of a second embodiment of the automatic centering apparatus at the staging area.

As seen in FIGS. 1A, 1B, and 7, the cured tire 10, having an outer circumferential surface 12, an inner bead upper surface 14, and an inner bead lower surface 16, has been placed upon automatic centering apparatus 20 for manipulation at the post-cure inflator apparatus 30. Automatic centering apparatus 20 is composed of a frame 22 (substantially removed for viewing purposes), a plurality of inwardly directed centering rollers 24, and a plurality of gravity-induced discharge rollers 26. Apparatus 20 further includes tire positioning apparatus 40, bead control apparatus 50 for correlation with post-cure inflator.

As the outer circumferential surface 12 of the cured tire passes along inwardly directed rollers 24, the tendency of said rollers concentrates the direction of tire 10 in a straight line along apparatus 20. In this manner, inwardly directed rollers 24 may transport tire 10 over considerable distances either at a level or sloped elevation, and movable by powered rollers spaced intermittently, or other force applied to tire 10 upon contact with rollers 24. Automatic centering apparatus 20 controls the movement of tire 10 into the tire positioning apparatus 40, which begins the centering operation of the cured tire 10 for transfer over the post-cure inflator apparatus 30.

The post-cure inflator apparatus 30 is of a design commonly known to those skilled in the art for the inflation of cured tires immediately after curing and pressing. The apparatus 30 is composed of a lower post-cure inflator, generally described as 32, which comprises a lower inflator ring 36 which securedly engages the inner bead lower surface 16 of the cured tire 10 and an upper inflator ring 38 as shown in FIG. 5 and described below. Further, apparatus 30 may include a multiplicity of stationary tire positioning cones 34, as seen in FIGS. 1-6 or a plurality of stationary, radially-oriented cylinders 35, as seen in FIG. 8.

Because it is an object of the invention to provide accurate centering of the cured tire over the appropriate post-cure inflator apparatus components, the detailed adjustments of the movement of apparatus 20, 40 and 50 is dependent upon the tire post-inflator apparatus 30 presently used. However, the scope of this invention is not to be limited to the type of post-cure inflator apparatus described in the drawings and this text.

Reference is made to FIGS. 1A and 1B for a view of one embodiment of tire positioning apparatus 40 of the present invention. Apparatus 40 is composed of curvilinear portion 42 which engages the leading outer circumferential surface 12 of the cured tire 10, angled contact portion 43, which engages the trailing outer circumferential surface 13 of the cured tire 10, and a variety of components to permit the slidable action of apparatus 40 while restraining or controlling tire 10. These components comprise a power means 44 for positioning contact portions 42 and 43 in their proper positions, said means 44 connected to portions 42 and 43 by a ball screw device 45, threaded bracket 46, roller bracket 48, and rollers 49, the latter engaging rail 47. As power means 44 rotate ball screw 45, portions 42 and 43, mounted on brackets 48 and 46, travel along ball screw 45 and rail 47, respectively. Use of rollers 49 and ball screw 45 permit incremental positioning of apparatus 40 over the proper locations on the post-cure inflator apparatus 30. Further, power means 44, typically an electric motor, prohibits drift of apparatus 40 once the position of apparatus 40 on apparatus 30 has been located.

Figure 8:
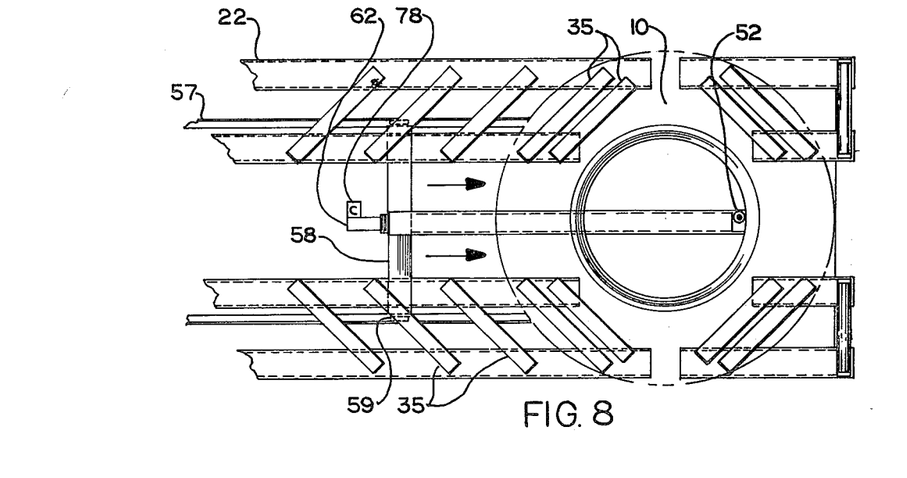
FIG. 8 is a top plan view of the second embodiment of the automatic centering apparatus in conjunction with the post-cure inflator apparatus.

Referring to FIG. 7 and 8, a view of the second embodiment of tire positioning apparatus 80 is seen. The tire positioning apparatus 80 is composed of complementary gates 81 and 83, each gate having a curvilinear contact portion 82 and a connecting portion 86. Power means 84 on each gate, or a single means 84 simultaneously connected to each gate, rotates each gate about pivot point 89. Curvilinear contact portions 82 of each gate 81 and 83 combine to contact the leading outer circumferential surface 12 of tire 10.

Tire positioning apparatus 80 does not slide along apparatus 20 while the cured tire 10 is centered over post-cure inflator apparatus 30. Rather, in those instances when centering of the tire 10 may be accomplished with apparatus 50 and stationary, radially oriented rollers 35, apparatus 80 merely serves to restrain tire 10 in this staging area prior to centering over apparatus 30. Thus, each gate 81 and 82 rotates about pivot points 89, and tire 10 is manipulated exclusively by bead control apparatus 50 in the succeeding operations.

A key feature of the invention is the operation of bead control apparatus 50. Apparatus 50 is composed of a pivotable bead control finger 52 and a variety of components which permit the slidable movement of finger 52. These components are a bead control motor means 54, a ball screw 55, which interacts with threaded bracket 56 to slide apparatus 50 along apparatus 20. Further, apparatus 50 has a rail 57 which interacts with rollers 59 connected to a roller bracket 58 to facilitate movement of apparatus 50 along apparatus 20. Finally, bead control finger 52 is pivotable about pivot point 53, as controlled by bead activation means 62. Linkage 64 connects activation means 62 with the pivot point 53. Bead control finger 52 engages the lower inner circumferential surface 16 of tire 10 to transfer that workpiece to an accurately centered position over apparatus 30. Further, when the apparatus 80 is used, the bead control finger may also contact the trailing outer circumferential surface 13 of tire 10, in order to transfer the tire 10 from apparatus 30 to the next operation. The pivotable nature of bead control finger 52 permits apparatus 50 to be used with any annular workpiece and to control both linear directions by contact within the inner circumferential surface 16 and outer circumferential surface 13, without disrupting the centered position of the workpiece over the work station.

The various mechanical apparatus 20, 30, 40, 80, and 50 are controlled by various sensors, switches, and control units, which drive the automatic centering apparatus 20 through the preset, predetermined centering operation for the tire over post-cured inflator apparatus 30. These items will be described in the application according to their function rather than the particular electronic components. At a point adjacent to curvilinear contact portion 42 is tire contact indicator switch 72. The positioning apparatus 40 is controlled by a positioning control means 74. Likewise, the movement of the control apparatus 50 is determined by bead finger control means 76. The actuation and deactivation of the pivoting of bead control finger 52 is controlled by pivot control 78. Also control means 75 controls the rotation of apparatus 80. Finally, the post-cure inflator apparatus 30 is extended and retracted according to post-cure inflator control 33 located, for illustrative purposes, adjacent to apparatus 30.

For an understanding of the scope of the process for centering the cured tire 10 over the post-cure inflator apparatus 30, reference is had to the Figs. for a numerical and sequential operation. In the first embodiment, as seen in FIGS. 1A and 1B, the cured tire 10 moves in the forward direction along inwardly directed rollers 24 on frame 22. The tire 10 continues along rollers 24 until it engages the annular contact portion 42 of tire positioning apparatus 40. This contact between tire 10 and portion 42 activates switch 72 which, in turn, activates bead control apparatus 50. Upon the depression of switch 72, control 78 pivots the bead control finger 52 at pivot point 53, according to a direction of bead activation means 62, by connection with linkage 64. As shown in FIG. 1B, bead control finger 52 is transformed to a vertical position, and bead finger control means 76 within bead control motor means 54 directs the move of apparatus 50 to a point where bead control finger 52 engages the inner bead lower surface 16 of the tire 10. Movement of the bead control finger 52 is accomplished by a rotation of ball screw 55, powered by means 54, moving threaded brackets 58 and 56, and moving rollers 59 along rail 57. Once the control finger 52 engages surface 16, the tire 10 is contacted between positioning apparatus 40 and bead control apparatus 50.

Figure 2:
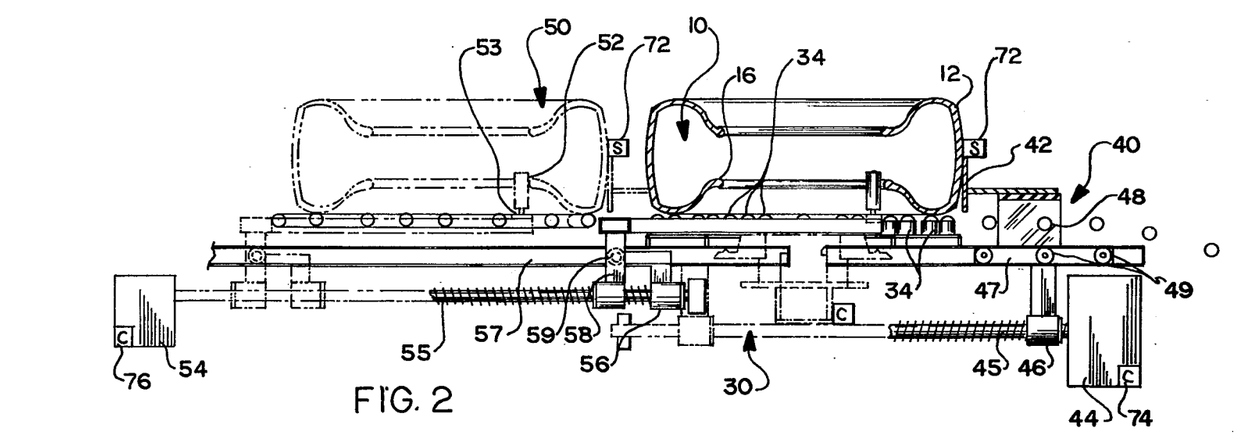
FIG. 2 is a view, as in FIG. 1B, demonstrating the movement of the cured tire onto the post-cure inflator apparatus.

Turning to sequence No. 2 in FIG. 2, the positioning apparatus 40 is activated by positioning control means 74 in positioning motor means 44. The retraction of annular contact portion 42 retreats the tire-positioning apparatus 40 to a position predetermined and preset according to the calculations of the operator of this automatic equipment. The predetermined distance is calculated by determining the cross-sectional thickness of the tire from the leading bead diameter to the leading outside diameter of the tire, and the extent to which bracket 46 turns on ball screw 45 controls the setting of this position. Control means 74 has sufficient components to determine this operation and repeat it during the course of automatic operation.

Bracket 46 is interconnected with bracket 48 and both are slidable with rollers 49 on rail 47. The positioning of annular contact portion 42 establishes the extent of the forward movement of the cured tire 10 over centering cones 34.

Simultaneous with the movement of annular contact portion 42, controlled by means 74, is the forward movement of bead control apparatus 50 forcing the cured tire 10 in a forward direction. Bead control finger 52 continues to engage lower bead surface 16 and slides the cured tire on its surface 12 from rollers 24 onto positioning cones 34 of the post-cure inflator apparatus 30. This movement of the bead control finger 52 is the same as that described with reference to the initial contact of finger 52 with surface 16. Brackets 56 and 58 move as ball screw 55 turns according to bead control power means 54, as controlled by means 76. Rollers 59 roll upon rails 57 and the entire apparatus 50 travels forward. Control 76 has been preset and predetermined, according to the cross-sectional thickness from the leading bead diameter to the leading outside diameter of the tire, in order to accurately and repeatedly place the cured tire 10 over the significant portions of the post-cure inflator apparatus 30 without compressing any portion of the tire 10 during this transfer movement. The constant contact of finger 52 with surface 16 assures exacting placement according to the preset location. As with FIG. 1B, the tire 10 is restrained between bead control finger 52 and annular contact portion 42.

Figure 3:
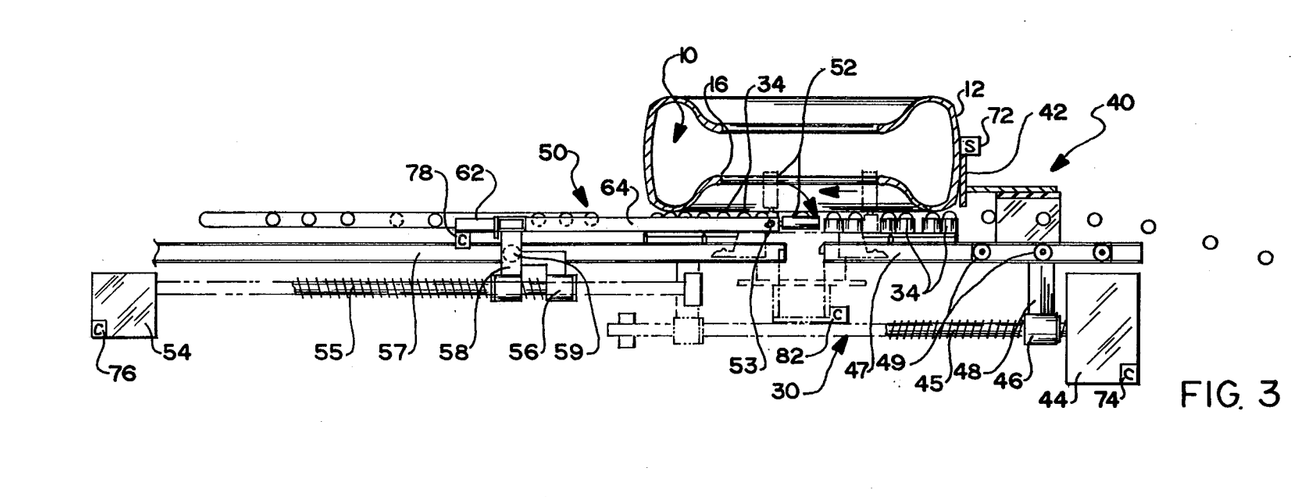
FIG. 3 is a view as in FIG. 1B, wherein portions of the automatic centering apparatus are withdrawn to their original positions.

Referring now to FIG. 3, a portion of the centering apparatus 20 is prepared for withdrawal. In this sequence, the bead control apparatus 50 is withdrawn and retracted from the inner bead lower surface 16 of the tire 10. This withdrawal occurs by a reverse revolution of the ball screw 55 and its effect upon threaded brackets 56 and 58, and roller 59 along rail 57. At a predetermined point controlled by control 78 according to the internal diameter of tire 10, the bead control finger 52 returns to its horizontal position at pivot point 53 within the open area of the tire, in order to prevent the accurate, preset position of the tire from being disrupted during the retraction of apparatus 50. During this sequence shown in FIG. 3, positioning apparatus 40 continues to maintain the accurate present position of tire 10 on positioning cones 34 of post-cure inflator apparatus 30.

Figure 4:
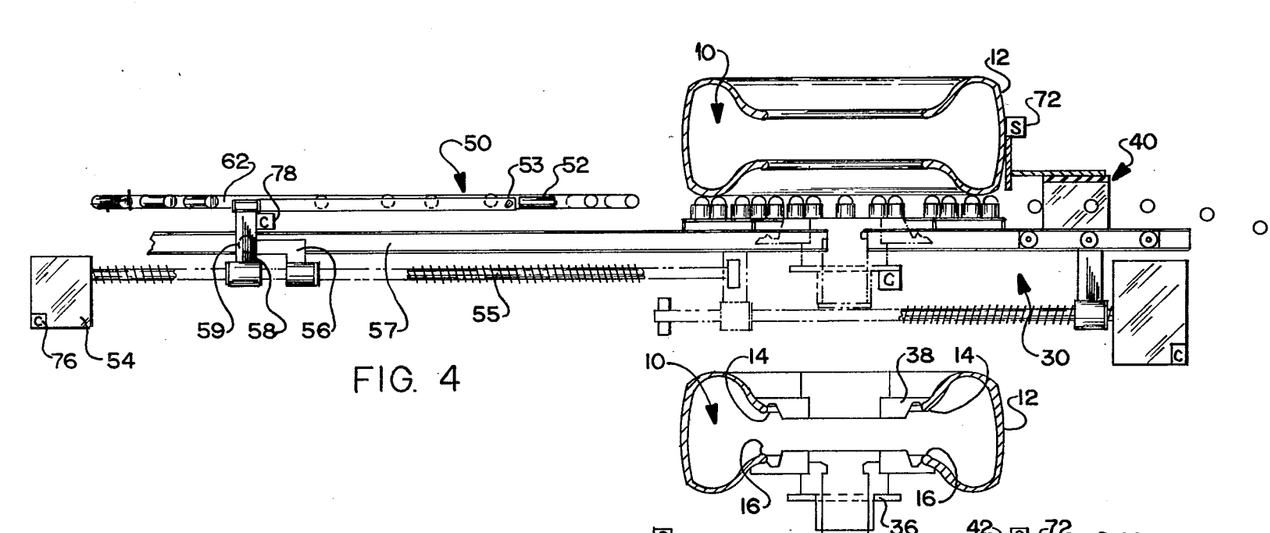
FIG. 4 is a view, as in FIG. 1B, demonstrating the sequence of withdrawal of certain portions of the automatic centering apparatus.
Figure 5:
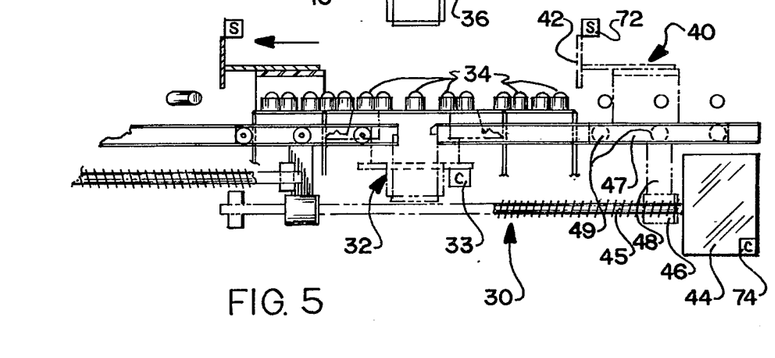
FIG. 5 is an abbreviated view of that as seen in FIG. 1B, demonstrating the operation of the post-cure inflator apparatus and its interaction with the remaining portions of the automatic centering apparatus.

Referring now to FIG. 4, the fourth sequence in the automatic centering operation is illustrated. Because bead control finger 52 has returned to its horizontal position, the entire bead control apparatus 50 may withdraw to its home position such as that found with reference to FIGS. 1A and 1B. The withdrawal of apparatus 50 is accomplished by a reverse revolution of ball screw 55. The brackets 56 and 58, as well as the bead activation means 52, linkage 64, and bead control finger 52 retract to the point of beginning, as controlled by bead finger control means 76 located within bead control motor means 54. Again, during the sequence illustrated in FIG. 4, the cured tire remains in its accurate and preset centered position over the post-inflator apparatus 30.

Referring now to FIG. 5, the activation of the post-inflator apparatus 30 is illustrated. From the lower post-cure inflator, generally described as 32, rises a lower inflator ring 36, as controlled by post-cure inflator control 33, to accurately engage the cured tire 10 already centered by apparatus 40 and 50. The lower inflator ring 36 rises with the cured tire 10 to engage the upper inflator ring 38. Between rings 36 and 38, the inner bead upper surface 14 and the inner bead lower surface 16 are contacted in a sealed manner against the respective rings 36 and 38 in order to permit inflation of the cured tire 10 during this post cure inflation cycle.

While the post-inflator apparatus 30 is inflating the tire at this elevated position, the entire tire-positioning apparatus 40 returns to its home position, such as that shown in FIGS. 1A and 1B. This is accomplished by a reverse revolution of ball screw 45 affecting bracket 46 and the remaining components of the apparatus 40 described above. The point of return is controlled by positioning control means 74 located within positioning motor means 44. After the cured tire 10 has been inflated by apparatus 30, the cured tire 10 and lower inflator ring 36 return to their home positions. The cured tire 10 rests upon the same positioning cones 34 in the same accurately centered position, while the lower inflator ring 36 retracts into the recess within lower post-cure inflator 32.

As may be seen in reference to FIG. 1A, angled contact portion 43 is substantially adjacent to the trailing outer circumferential surface 12 when the cured, post-cure inflated tire returns to contact positioning cones 34.

Figure 6:
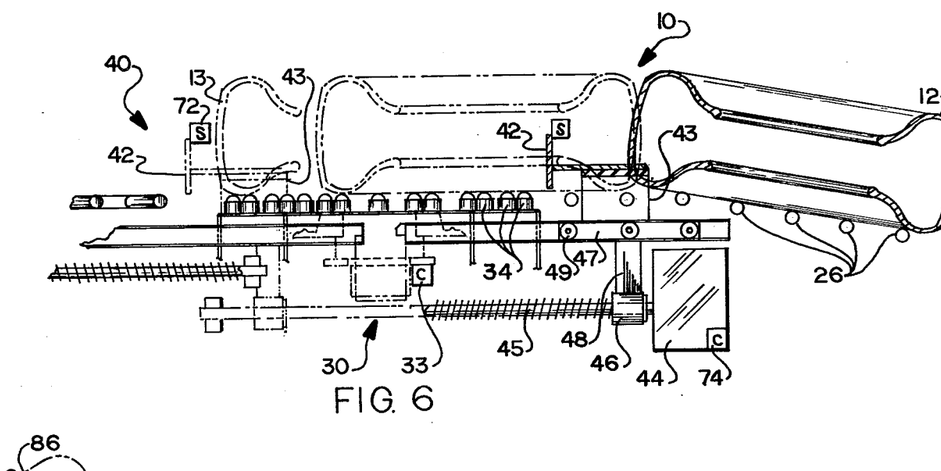
FIG. 6 is a view, as in FIG. 5, showing the action of the automatic centering apparatus to discharge the cured, post-cure inflated tire from the production point.

With reference to FIG. 6, an understanding of the final step in the automatic centering system is achieved. Because the cured, post-cure inflated tire 10 has been returned to positioning cones 34, tire 10 is prepared for discharge along gravity discharge rollers 26. The angled contact portion 43 of tire-positioning apparatus 40 engages the trailing circumferential surface 12 of cured tire 10 in order to direct the tire from post-inflator apparatus 30 onto gravity discharge rollers 26. The angled edge of portion 43 maintains the direction of the tire 10 until it is completely upon the gravity discharge rollers 26. For the movement of angled contact portion 43, the motor means 44 turns ball screw 45 in a forward direction, interacting with brackets 46, 48, rollers 49, and other components of apparatus 40 previously described. The distance to which the angle contact portion 43 must travel in order to place tire 10 on rollers 26 is controlled by positioning control means 74 located within motor means 44.

When the final point of discharge has been reached by angled contact portion 43, tire positioning apparatus 40 returns to its preset, predetermined home position from where it originated this sequence. Once again, positioning control means 74 determines the extent that positioning motor means 44 turns ball screw 45 to return the annular contact portion 42 to the point where it may receive another cured cycle.

In those instances when tire positioning apparatus 40 is unnecessary, tire positioning apparatus 80 is used. Apparatus 80 has two pivotable gates 81 and 83 which restrain cured tire 10 as it travels from a tire press along rollers 24. Thereafter, bead control apparatus 50 controls the preset, predetermined position of the tire 10 over the positioning cones 34 or radially-oriented cylinders 35 for post-cure inflating by apparatus 30. Because cylinders 35 or cones 34 maintain tire 10 stationary on the level surface of apparatus 30, the tire 10 need not be restrained by any apparatus 40 or 80. Therefore the function of apparatus 80 is confined to its pivotable nature on rollers 24.

With this reduction in the functions and movement of apparatus 80 over that of apparatus 40 of the first embodiment, a number of sequences described above need further explanation. FIG. 7 illustrates the function of apparatus 80 to restrain tire 10 after it has moved along rollers 24. The curvilinear contact portions 82 of each restraining gate 81 and 83 adequately contact leading outer circumferential surface 12 of tire 10. This function is analogous to Sequence 1 shown in FIGS. 1A and 1B. Gates 81 and 83 likewise have a contact switch 72, which activates bead finger control 78 and finger 52 to pivot at pivot point 53. Apparatus 50 then travels in the forward direction in order for finger 52 to contact surface 16 of tire 10, as described above and shown in FIG. 1B.

As seen in FIG. 7, gates 81 and 83 may rotate on pivot points 89 to permit finger 52 to direct tire 10 toward inflator apparatus 30. Rotation is accomplished by power means 84, controlled by control means 75, pulling connecting portion 86 of each gate 81 and 83. As seen in FIG. 8 apparatus 50, with finger 52 contacting surface 16 of tire 10, moves forward to center tire 10 in the preset, predetermined location on cylinders 35 for accurate bead securement by inflator apparatus 30. FIGS. 7 and 8 analogously demonstrate Sequence 2 described above for the embodiment using apparatus 40. After tire 10 has passed, upon activation of power means 84 in the reverse direction, gates 81 and 83 are pivotted to their home position.

Sequences 3, 4 and 5 shown in FIGS. 3–5 and described above are applicable to this description for the second embodiment employing apparatus 80. As seen in FIG. 3, Sequence 3 (FIG. 3) retracts the bead finger 52 to its horizontal position, while Sequence 4 (FIG. 4) returns the entire apparatus to its home position. Sequence 5 (FIG. 5) remains unchanged for the operation of apparatus 30, but because apparatus 40 has been substituted by apparatus 80, no return action such as that seen in FIG. 5 is needed for a tire positioning apparatus. During Sequences 3–5, the tire 10 remains in the preset, predetermined position as placed by bead control apparatus 50. After apparatus 50 and finger 52 have moved, tire 10 maintains its position on the level surface through contact with stationary radially-oriented cylinders 35 as seen in FIGS. 7–9.

Figure 9:
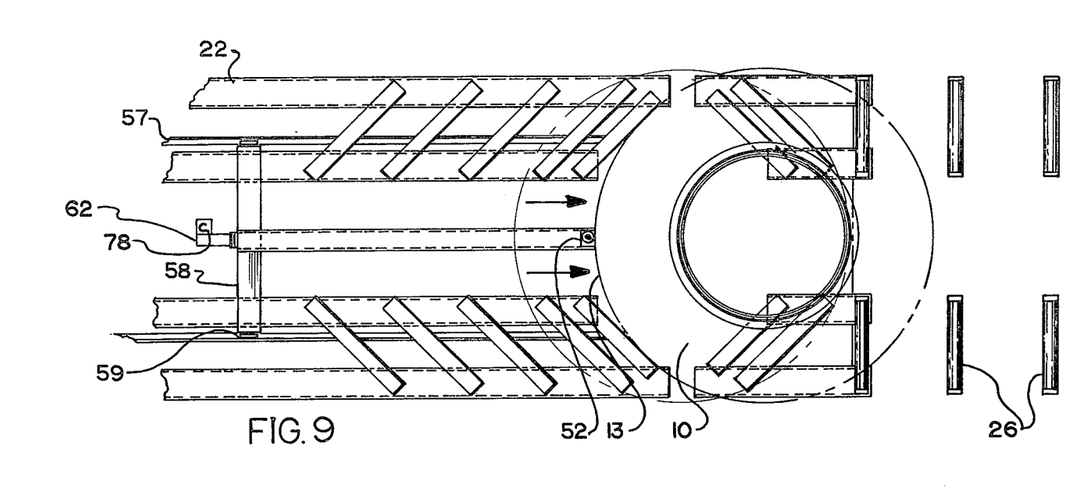
FIG. 9 is a top plan view of the second embodiment of the automatic centering apparatus discharging the post-cured inflated tire.

Sequence 6 for the second embodiment is shown in FIG. 9. Because tire positioning apparatus 80 merely pivots about points 89, bead control apparatus 50 must reactivate to push the post-cure inflated tire 10 from cylinders 35 on to gravity-induced rollers 26. Activation of bead control finger 52 is made by control means 78 upon a return to the home position of inflator apparatus 30. Activation of the entire bead control apparatus 50 is made by control means 76 within power means 54. Bead control finger 52, moving in the forward direction, contacts the trailing outer circumferential surface 13 of tire 10 and pushes tire 10 on to rollers 26. After tire 10 has departed on rollers 26, apparatus 50 returns to its home position and finger 52 pivots to its horizontal position. With these functions completed, automatic centering apparatus 20 is prepared to accept the next tire 10 from rollers 24.

The sequences of receiving the cured tire, transferring the cure tire to the post-cure inflator apparatus 30, and discharging the cured, post-cure inflated tire 10 from the apparatus 30 may be repeated as often as necessary. The preset, predetermined control mechanisms 72, 74, 75, 76, and 78 are adjusted according to the size of tire to be post-cure inflated. It has been found that use of automatic centering apparatus 20, positioning apparatus 40 or 80 and bead control apparatus 50, in conjunction with a conventional post-inflator apparatus 30, maintains a completely automated and preset centering system for the accurate placement of a cured tire over the post-inflator apparatus 30. The need for manual control of tire placement on inflator apparatus is eliminated.

While in accordance with the patent statutes, the best mode and preferred embodiment of the invention has been disclosed herein, it is to be understood that this invention is not to be limited thereto or thereby. Consequently, for an understanding of the scope of the invention, reference is had to the following claims.

What is claimed is:

1. An automatic workpiece centering device on a frame between two work stations, the workpiece being of annular shape and having an inner circumferential surface and an outer circumferential surface, comprising:
   (a) a plurality of conveyor rollers rotatably mounted on the frame at inward angles;
   (b) a movable workpiece positioning apparatus mounted on the frame and having a curvilinear contact surface to contact the outer circumferential surface of the workpiece;
   (c) a slidable interior control apparatus slidably mounted on the frame and having a pivotable interior control finger pivotally extending therefrom capable of communication with the inner circumferential surface of the workpiece;
   (d) a plurality of stationary contact items mounted on the frame at the second work station, said workpiece positioning apparatus restraining the workpiece on said conveyor rollers, said pivotable interior control finger controlling the annular workpiece in a forward direction to the second work station, and said stationary contact items maintaining the workpiece at the work station in an accurately centered position, wherein said slidable interior control apparatus comprises an interior control motor means for powering said apparatus, a ball screw, at least one threaded bracket, at least one roller bracket, a plurality of rollers, at least one rail, and an interior finger activation means for pivoting said interior control finger about a pivot point between horizontal and vertical positions; and
   said roller brackets interconnected with said threaded brackets, said motor means connected to said ball screw rotatable within said threaded brackets interconnected with said roller brackets and said rollers on said roller brackets rotatable on said rails, such that said interior activation means and said interior control finger may travel along the frame in both directions of said rails between its home position and at the second work station.

2. An automatic workpiece centering device on a frame between two work stations, the workpiece being of annular shape and having an inner circumferential surface and an outer circumferential surface, according to claim 1, wherein said interior control apparatus is housed within the frame beneath the horizontal surface of said conveyor rollers and wherein said pivotable interior control finger may pivot to a vertical position above the horizontal surface of said conveyor rollers.

3. An automatic workpiece centering device on a frame between two work stations, the workpiece being of annular shape and having an inner circumferential surface and an outer circumferential surface, according to claim 2, wherein said rails and said ball screw are of sufficient length to permit said interior control apparatus to travel on said rails to a position at second work station with said interior control finger in a vertical position contacting the inner circumference of annular workpiece.

4. An automatic workpiece centering device on a frame between two work stations, the workpiece being of annular shape and having an inner circumferential surface and an outer circumferential surface, according to claim 2, wherein said motor means has a reversible motor to permit said interior control apparatus to travel on said rails from the second work station to its home position.

5. An automatic workpiece centering device on a frame between two work stations, the workpiece being of annular shape and having an inner circumferential surface and an outer circumferential surface, according to claim 2, wherein said workpiece positioning apparatus comprises a pivotable positioning apparatus, rotatably mounted on the frame, having a pair of pivoting workpiece restraint gates, and power means for pivoting each said restraint gate about a pivot point; each said restraint gate having a connecting portion connected to each said curvilinear contact surface.

6. An automatic workpiece centering device on a frame between two work stations, the workpiece being of annular shape and having an inner circumferential surface and an outer circumferential surface, according to claim 2, wherein said workpiece positioning apparatus comprises a slidable positioning apparatus, slidably mounted on the frame, having an angled contact surface on the opposing side from said curvilinear contact surface capable of contact with the trailing edge outer circumferential surface of the workpiece;
   said slidable positioning apparatus further having a positioning motor means for powering said apparatus, a ball screw, at least one threaded bracket, at least one roller bracket, a plurality of rollers and at least one rail;
   said rollers brackets interconnected with said threaded brackets, said positioning motor means connected to said ball screw rotatable within said threaded brackets and said rollers on said roller brackets rotatable on said rails, such that said curvilinear contact surface and said angled contact surface may travel along the frame in both directions of said rails between its home position and at the second work station.

7. An automatic workpiece centering device on a frame between two work stations, the workpiece being of annular shape and having an inner circumferential surface and an outer circumferential surface, according to claim 5 or 6, wherein said surfaces of said workpiece positioning apparatus is housed on the frame above the horizontal surface of said conveyor rollers and wherein the remainder of said workpiece positioning apparatus is housed within the frame beneath the horizontal surface of said conveyor rollers.

8. An automatic workpiece centering device on a frame between two work stations, the workpiece being of annular shape and having an inner circumferential surface and an outer circumferential surface, according to claim 5 or 6, wherein said plurality of stationary contact items comprises a plurality of radially oriented cylinders about the second work station.

9. An automatic workpiece centering device on a frame between two work stations, the workpiece being of annular shape and having an inner circumferential surface and an outer circumferential surface, according to claim 5 or 6, wherein said plurality of stationary contact items comprises a plurality of positioning cones.

10. A method for centering an annular workpiece on a work station, comprising:
  (a) sliding the annular workpiece along a plurality of inwardly angled conveyor rollers;
  (b) contacting the outer circumferential surface of the annular workpiece with a curvilinear contact surface of a workpiece positioning apparatus;
  (c) contacting the inner circumferential surface of the annular workpiece with a pivotable control finger of an interior control apparatus;
  (d) disengaging said outer circumferential surface of the annular workpiece from said curvilinear contact surface of said workpiece positioning apparatus, wherein said disengaging said outer circumferential surface comprises sliding a slidable workpiece positioning apparatus in a forward direction past the work station and retracting said slidable positioning apparatus to its home position while the workpiece is elevated at the work station;
  (e) sliding said interior control apparatus in a forward direction to push the annular workpiece to an accurately centered position on the work station;
  (f) disengaging said interior control finger from said inner circumferential surface of said annular workpiece; and
  (g) retracting said interior control apparatus to its home position.

11. A method for centering an annular workpiece on a work station, according to claim 10, further comprising the steps of pivoting said interior control finger to a vertical position prior to contacting said inner circumferential surface of the annular workpiece, and pivoting said interior control finger to a horizontal position after disengaging said inner circumferential surface and before retracting said interior control apparatus.

12. A method for centering an annular workpiece on a work station, according to claim 10, wherein said disengaging said outer circumferential surface further comprises pivoting a pair of restraint gates of a pivotable workpiece positioning apparatus.

13. A method for centering an annular workpiece on a work station, according to claim 10, further comprising:
  sliding said interior control apparatus with said interior control finger vertically pivoted in a forward direction to push the annular workpiece from the accurately centered position and from the work station; and
  retracting said interior control apparatus to its home position.

14. A method for centering an annular workpiece on a work station, according to claim 10, further comprising:
  sliding said slidable workpiece positioning apparatus from the accurately centered position and from the work station; and
  retracting said slidable workpiece apparatus to its home position.

* * * * *

UNITED STATES PATENT OFFICE
CERTIFICATE OF CORRECTION

Patent No. 4,360,096      Dated November 23, 1982

Inventor(s) Harold S. Rocco, et al

It is certified that error appears in the above-identified patent and that said Letters Patent are hereby corrected as shown below:

Column 12, line 29, insert the words --in a forward direction to push the annular workpiece-- after the words "positioning apparatus".

Signed and Sealed this

Twenty-second Day of February 1983

[SEAL]

Attest:

Attesting Officer

GERALD J. MOSSINGHOFF

Commissioner of Patents and Trademarks